(12) United States Patent
Cohen (10) Patent No.: US 12,137,098 B2
(45) Date of Patent: *Nov. 5, 2024

(54) SYSTEMS AND METHODS FOR ACCESS CONTROL

(71) Applicant: Aktana, Inc., San Francisco, CA (US)

(72) Inventor: Adiel Cohen, New York City, NY (US)

(73) Assignee: Aktana, Inc., San Francisco, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/383,242

(22) Filed: Jul. 22, 2021

(65) Prior Publication Data
US 2022/0086161 A1    Mar. 17, 2022

Related U.S. Application Data

(63) Continuation of application No. 17/002,697, filed on Aug. 25, 2020, now Pat. No. 11,108,780, which is a
(Continued)

(51) Int. Cl.
*G06Q 30/0201*    (2023.01)
*G06N 3/08*    (2023.01)
(Continued)

(52) U.S. Cl.
CPC .............. *H04L 63/101* (2013.01); *G06N 3/08* (2013.01); *G06Q 30/0201* (2013.01);
(Continued)

(58) Field of Classification Search
CPC ... H04L 63/101; H04L 63/102; H04L 63/105; G06N 3/08; G06Q 30/0201; H04W 12/00; H04W 12/08; G06F 2221/2141
See application file for complete search history.

(56) References Cited

U.S. PATENT DOCUMENTS

| 5,956,715 A | 9/1999 | Glasser et al. |
| 8,479,302 B1 | 7/2013 | Lin |
| (Continued) | | |

FOREIGN PATENT DOCUMENTS

| EP | 1374014 A1 | 1/2004 |
| WO | WO-2021061206 A1 | 4/2021 |

OTHER PUBLICATIONS

U.S. Appl. No. 17/002,697 Notice of Allowance dated Jun. 2, 2021.
(Continued)

*Primary Examiner* — Robert B Leung
*Assistant Examiner* — Howard H. Louie
(74) *Attorney, Agent, or Firm* — Wilson Sonsini Goodrich & Rosati (57) ABSTRACT

The present disclosure provides systems, methods, and computer program products for controlling and securing access to a computing environment comprising a plurality of resources that access data. An example method can comprise (a) segmenting the data into a plurality of data segments; (b) associating a user of a plurality of users of the computing environment with one or more data segments of the plurality of data segments; and (c) providing an access control system that defines access to the plurality of resources comprising a first resource. The first resource can be associated with one or more data segments of the plurality of data segments. The method can further comprise (d) determining whether the user has permission to access the first resource using the access control system. The determining can comprise verifying whether the user and the first resource are associated with at least one same data segment.

17 Claims, 5 Drawing Sheets

Related U.S. Application Data continuation of application No. PCT/US2020/036411, filed on Jun. 5, 2020.

(60) Provisional application No. 62/907,478, filed on Sep. 27, 2019.

(51) Int. Cl.
  *H04L 9/40* (2022.01)
  *H04W 12/00* (2021.01)
  *H04W 12/08* (2021.01)

(52) U.S. Cl.
  CPC .......... *H04L 63/102* (2013.01); *H04L 63/105* (2013.01); *H04W 12/00* (2013.01); *H04W 12/08* (2013.01); *G06F 2221/2141* (2013.01)

(56) References Cited

U.S. PATENT DOCUMENTS

| | | | |
|---|---|---|---|
| 9,332,002 B1* | 5/2016 | Bowen | H04L 63/0823 |
| 9,495,557 B2 | 11/2016 | Paymal et al. | |
| 9,774,586 B1 | 9/2017 | Roche et al. | |
| 9,967,750 B1* | 5/2018 | Fernandez | G06N 20/00 |
| 10,303,894 B2 | 5/2019 | Ahmed et al. | |
| 10,884,894 B2* | 1/2021 | Walters | G06F 11/3608 |
| 11,108,780 B2 | 8/2021 | Cohen | |
| 2003/0154403 A1 | 8/2003 | Keinsley et al. | |
| 2003/0172280 A1 | 9/2003 | Scheidt et al. | |
| 2007/0136603 A1* | 6/2007 | Kuecuekyan | H04L 63/0884 |
| | | | 713/185 |
| 2012/0047576 A1* | 2/2012 | Do | G06F 21/606 |
| | | | 711/163 |
| 2012/0272027 A1 | 10/2012 | Zbiciak | |
| 2015/0046985 A1 | 2/2015 | D'Souza et al. | |
| 2016/0171854 A1 | 6/2016 | McGowan et al. | |

OTHER PUBLICATIONS

U.S. Appl. No. 17/002,697 Office Action dated Jan. 22, 2021.
PCT/US2020/036411 International Search Report and Written Opinion dated Aug. 12, 2020.
Sandhu et al. "Role-based access control models," in: Computer (Feb. 1996). Retrieved Jul. 28, 2020 from URL: https://csrc.nist.rip/groups/SNS/rbac/documents/sandhu96.pdf. 22 pages.

* cited by examiner

SYSTEMS AND METHODS FOR ACCESS CONTROL

CROSS-REFERENCE

This application is a continuation application of U.S. application Ser. No. 17/002,697, filed on Aug. 25, 2020, which application is a continuation application of U.S. International Application No. PCT/US2020/036411, filed on Jun. 5, 2020, which application claims priority to U.S. Provisional Patent Application No. 62/907,478, filed on Sep. 27, 2019, which applications are incorporated herein by reference in their entirety.

BACKGROUND

A multi-tenant computing environment is a computing environment in which a single instance of software serves multiple tenants. A tenant can be a group of users that share common access privileges to the software instance. The software instance can provide each tenant a dedicated share of its data, software services, configurations, and user management functionality.

An access control system can prevent one tenant of a multi-tenant computing environment from accessing another tenant's data. An access control system can additionally prevent a user of a particular tenant from accessing data that is unrelated to the user's job function. One type of access control system is a role-based access control (RBAC) system. An RBAC system may define hundreds of roles and configuring such a system may be difficult without erroneously assigning some users to incorrect roles. Additional complexity can arise when users take on new roles or leave roles. Another type of access control system is an access control list (ACL). An access control list can directly map users to resources. However, in large multi-tenant computing environments with dozens of clients and thousands of users, it may become difficult to control and audit such mappings without errors.

SUMMARY

The present disclosure provides systems, methods, and computer program products for controlling access to a computing environment. The computing environment can store data and provide access to services that process or serve the data to users. Such data and services may be collectively referred to as "resources" in this disclosure. The systems described herein can control access to such resources by supplementing a traditional access control system (e.g., a role-based access control ("RBAC") system, an attribute-based access control ("ABAC") system, an access control list ("ACL"), or the like) with a data-based access control system. The data-based access control system can prevent administrator errors (e.g., errors that occur in configuring the traditional access control system) from enabling one tenant to access another tenant's data, or from enabling a user to access data unrelated to his job function.

An example system described herein can segment data into a plurality of data segments. The data segments can be virtual partitions of data in the computing environment. The data segments can be disjoint, overlapping, or both. Additionally or alternatively, some or all of the data segments can be hierarchical. That is, one data segment can be a subset of another data segment. In the case of a multi-tenant computing environment for marketing and selling drugs to health care providers by company A and company B, the system can initially segment the data in the computing environment into data that belongs to company A and data that belongs to company B. The system can further segment the data that belongs to company A, for example, into data from Europe and data from the United States. The system can further segment the data from Europe into sales data for drugs X, Y and Z. In this way, the system can generate a virtual, hierarchical tree of data in the computing environment.

After segmenting the data as described above, the system can associate a user of the computing environment with one or more of the data segments. Referring again to the multi-tenant computing environment for marketing and selling drugs to health care providers, the system can associate a German sales representative of company A with the Europe data segment for company A. On the other hand, the system may associate a global vice president of company A with both the Europe and United States data segments for company A.

The system can additionally associate resources in the computing environment with one or more of the data segments. For example, referring again to the multi-tenant computing environment for marketing and selling drugs to health care providers, the system can associate an instance of a database management tool for use by European sales representatives of company A who specialize in selling and marketing drug Y with a data segment defining European sales data for drug Y.

When an administrator attempts to give a user permission to access a resource in the computing environment using the computing environment's traditional access control system, e.g., by assigning the user to a role or adding the user to an ACL, the system can verify whether the resource and the user are associated with at least one of the same data segments. Alternatively or additionally, the system can perform this verification operation after the user is granted permission to access a resource through the traditional access control system but before the user attempts to use the resource.

The system described above can provide the following advantages. First, verifying that users and resources in a computing environment are associated with at least one same data segment can mitigate the effects of administrator errors in configuring the computing environment's traditional access control system. The traditional access control system may be an RBAC system in which each user is assigned to one or more roles that define their access to data and applications. And the computing environment may have multiple applications of the same type serving different tenants. Thus, role assignments may be specific to a particular instance of an application. An RBAC system controlling access to such a computing environment may define hundreds of roles, and configuring such an RBAC system may be difficult without erroneously assigning some users to incorrect roles. Additional complexity can arise when users take on new roles or leave roles. The systems described in the present disclosure can reduce the risk of errors made as a result of this complexity.

In some other multi-tenant computing environments, access to resources is controlled by an ACL that directly map users to resources. However, in large multi-tenant computing environments with dozens of clients and thousands of users, it may become difficult to control and audit such mappings without errors. The systems described herein can reduce the impact of administrator errors by providing a backstop against those errors.

Still other multi-tenant computing environments can use ABAC systems. ABAC systems can grant access based on user and system attributes evaluated using access rules. Attribute configurations and assignments are performed by humans and are susceptible to human error in the same way as mappings between users and resources in ACLs. Additionally, in large multi-tenant environments, multiple attributes may be needed to define fine-grain access to data. The complexity of assigning and maintaining these attributes increases as the number of users and roles increases. It may also be difficult to report or audit user permissions as the number of access rules increases. ABAC systems may normally operate during the actual user request for access, evaluating and granting access to resources in real-time. In contrast, the systems described herein can prevent user permissions from being assigned in the first instance. That is, the systems described herein provide an additional, configuration-time access control system to validate the settings of an ABAC against data-centric resource mappings.

A second advantage of the system described above is that removing user permissions is easier. If, for example, a U.S. pharmaceutical sales representative for company A moves to Canada, disassociating him from U.S. data segments can automatically remove his to access to applications that serve U.S. data. An administrator need not reassign the user's roles or modify the user's attributes. Instead, the administrator can simply determine the type of data that the user should be able to access.

Third, the association of users with data segments can allow reporting at the data level. For example, an administrator can easily answer the question "which employees and users have access to U.S. data?" and report on the answer.

Fourth, the association of users with data segments can allow systems and administrators to perform large operations such as removing all users from accessing a particular data segment.

Fifth, the association of data segments with resources can help to avoid the appearance of a data leak. Consider, for example, a manager who has permission to access both U.S. and Canada data. The manager may login to a U.S. application but also see the Canada data displayed (e.g., due to a bad configuration of the user interface). While the manager is entitled to see the bad data, it may leave a lasting impression that her data is not secure. By enforcing data segment compliance end-to-end (e.g., from application programming interface to user interface), the system can validate the data to ensure that the user interface always displays the data it was meant to display regardless of user permissions.

The above-mentioned advantages constitute improvements to the technical field of cybersecurity. Cybersecurity may be particularly important when protected information is potentially subject to the Health Insurance Portability Accountability Act (HIPAA). Such information may include patient prescription information and the like.

An aspect of the present disclosure provides a computer-implemented method for controlling and securing access to a computing environment comprising a plurality of resources that access data. The method can comprise (a) segmenting the data into a plurality of data segments, (b) associating a user of a plurality of users of the computing environment with one or more data segments of the plurality of data segments, and (c) providing an access control system that defines access to the plurality of resources comprising a first resource. The first resource can be associated with one or more data segments of the plurality of data segments. The method can further comprise determining whether the user has permission to access the first resource using the access control system. The determining can comprise verifying whether the user and the first resource are associated with at least one same data segment. The method can further comprise, if the user does not have permission to access the first resource using the access control system as determined in (d), (1) preventing the user from being granted access permission to the first resource via the access control system or (2) preventing the user from accessing the first resource, and generating an alert indicative of the determination in (d).

In some implementations, the associating in (b) can comprise manually associating the user with the one or more data segments. In some implementations, the associating in (b) can comprise automatically associating the user with the one or more data segments. In some implementations, automatically associating the user with the one or more data segments comprises providing metadata about the user to a machine learning algorithm trained to identify the one or more data segments. In some implementations, the metadata comprises one or more of a location, a title, and a supervisor of the user. In some implementations, the machine learning algorithm is a supervised learning algorithm. In some implementations, the supervised learning algorithm is a neural network. In some implementations, the machine learning algorithm is an unsupervised learning algorithm.

In some implementations, the first resource can be manually associated with the one or more data segments. In some implementations, the first resource can be automatically associated with the one or more data segments.

In some implementations, the verifying can comprise verifying whether that the user is associated with all of the one or more data segments associated with the first resource. In some implementations, the verifying can be integrated into the access control system to prevent the user from being granted access permission to the first resource via the access control system. In some implementations, the verifying can be independent of the access control system to prevent the user from accessing the first resource after the permission has been provided by the access control system.

In some implementations, the plurality of data segments can comprise data segments that are overlapping, disjoint, or hierarchical.

In some implementations, the segmenting in (a) can be automated using empirical, artificial intelligence, or machine learning methods. In some implementations, the segmenting in (a) can be based on geographical, political or physical boundaries. In some implementations, the segmenting in (a) can be based on legal or cooperate boundaries.

In some implementations, the computing environment can be a multi-tenant system.

In some implementations, the method can further comprise restricting the user from accessing the first resource if the user is not associated with at least one same data segment as the first resource.

In some implementations, the plurality of resources can comprise a plurality of software services.

In some implementations, the segmenting in (a) can be based in part on a plurality of geographic regions, and wherein each resource of the plurality of resources is associated with a different one of the plurality of geographic regions. In some implementations, the segmenting in (a) is based in part on a plurality of customers, and wherein each resource of the plurality of resources is associated with a different one of the plurality of customers. In some implementations, each resource of the plurality of resources is associated with a different position at one of a plurality of customers.

In some implementations, the access control system can be a role-based access control system that defines a plurality of roles comprising a first role, wherein the first role defines access to the first resource. In some implementations, the access control system can be an attribute-based access control system. In some implementations, the access control system can comprise an access control list.

In some implementations, at least two of the plurality of data segments can have data in common. In some implementations, at least one data segment of the plurality of data segments can be a subset of another data segment of the plurality of data segments. In some implementations, the plurality of data segments can define a hierarchical tree of the data.

In some implementations, (b) can be performed prior to the user attempting to access the data.

In some implementations, the method can further comprise, prior to (b), determining the one or more data segments the user will be associated with based at least in part on one or more predefined roles to which the user is assigned.

In some implementations, the method can further comprise, repeating (d) upon disassociating the user from a data segment of the one or more data segments. In some implementations, the method can further comprise, repeating (d) upon modifying the access control system.

In some implementations, the method can further comprise generating a graphical representation of the one or more data segments that the user is associated with.

In some implementations, the method can further comprise repeating operations (c)-(d) for one or more additional resources of the plurality of resources.

In some implementations, the plurality of users can comprise automated agents.

In some implementations, the computing environment is a pharmaceutical sale platform.

In some implementations, the pharmaceutical sales platform comprises confidential or personally identifying information.

In some implementations, the pharmaceutical sales platform comprises sales and marketing data of one or more pharmaceutical products.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems, methods, and computer program products that can be used to control access to resources, e.g., data and software services, in a computing environment. The systems described herein can include a supplemental or orthogonal data-based access control system, which can be used as stand-alone or in conjunction with a traditional access control system (e.g., a role-based access control ("RBAC") system, an attribute-based access control ("ABAC") system, or an access control list ("ACL")). The data-based access control system can segment the data in the computing environment into virtual data segments and associate the users and resources in the computing environment with the data segments. When a user is granted access to a resource in the computing environment via the traditional access control system of the computing environment, the data-based access control system can verify that the users and the resources are associated with at least one of the same data segments or all of the same data segments. This verification operation can prevent administrator errors (e.g., errors that occur in configuring the traditional access control system) from enabling one tenant to access another tenant's data, or from enabling a user to access data unrelated to his job function.

Figure 1:
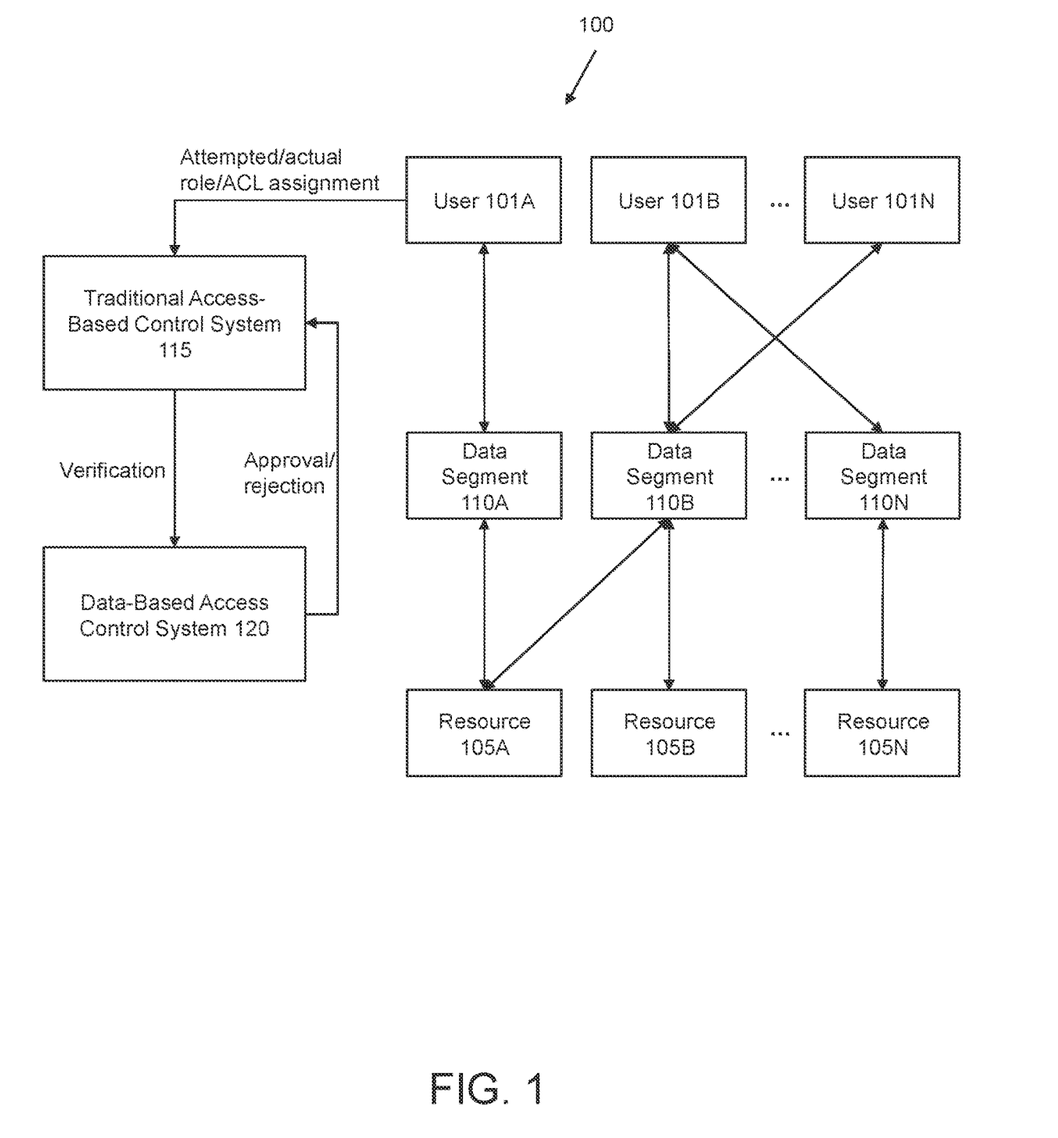
FIG. 1 schematically illustrates a multi-tenant computing environment in accordance with some embodiments.

FIG. 1 schematically illustrates a multi-tenant computing environment 100 in accordance with some embodiments. The multi-tenant computing environment 100 can be, to name a few examples, an application development platform, a data processing platform, a point-of-sale system, enterprise software, manufacturing software, marketing software, or the like. In one example, the multi-tenant computing environment 100 can be a pharmaceutical sales platform. Pharmaceutical companies can use the pharmaceutical sales platform to market and sell drugs to health care providers. The pharmaceutical sales platform can provide the pharmaceutical companies access to drug, health care provider, and sales data; lead-generation and appointment-scheduling functionality; and the like. Each pharmaceutical company that uses the pharmaceutical sales platform can be considered a different tenant, and each pharmaceutical company can have access to its own drug and sales data, for example.

The multi-tenant computing environment 100 can have any number of users 101A-101N, resources 105A-105N, data segments 110A-110N, a traditional access control system 115, and a data-based access control system 120.

The resources 105A-105N in the multi-tenant computing environment 100 can be data, software services that access, process, or serve the data, and the like. In the case of a pharmaceutical sales platform, the resources 105A-105N can include drug sales data, health care provider data (e.g., contact information, location data, prescription data, patient demographic data, and the like), database management tools for accessing the aforementioned data, scheduling tools, lead-generation tools, and the like. In the case of a computing environment that provides an application development platform, on the other hand, the resources 105A-105N can include an integrated development environment, libraries, compilers, and the like.

The multi-tenant computing environment 100 can also include a plurality of data segments 110A-110N. The data segments 110A-110N can be virtual partitions of data stored in the multi-tenant computing environment 100. The partitions can be disjoint, overlapping, hierarchical, or some combination thereof. The resources 105A-105N can be associated with one or more of the data segments 110A-110N. In general, a particular resource may be associated with a data segment so as to access, process, or serve data in that data segment. The users 101A-101N can also be associated with one or more data segments 110-110N.

The traditional access control system 115 can control access to the resources 105A-105N. More specifically, the traditional access control system 115 can define which users 101A-101N can access which resources 105A-105N. The traditional access control system 115 can be an RBAC system, an ABAC system, an ACL, or the like.

An RBAC system can define a plurality of roles. Each role can define resources or operations that users assigned to the role can access or perform. In an RBAC system, users are assigned to roles and through the roles inherit permissions; users may not be assigned permissions directly.

An ABAC system is an access control system that can define access to resources through the use of policies that evaluate whether a combination of attributes is true or false. The policies can use many types of attributes, e.g., user attributes, resource attributes, object attributes, environment attributes, and the like. An ABAC system can perform Boolean logic on the attributes to evaluate access requests. Unlike RBAC systems, which can have pre-defined roles, an ABAC generally evaluates access requests when such access requests are made.

Finally, an ACL can specify which users or processes (e.g., software services) have access to which objects (e.g., data). Each entry in an ACL can specify a subject and an operation.

In the systems described herein, the traditional access control system 115 can perform its normal functions. However, the traditional access control system 115 can be supplemented by a data-based access control system 120. The data-based access control system 120 can be configured to verify that a user who has or is being granted access to a particular resource, as defined by the traditional access control system 115, is associated with at least one same data segment as the resource. This verification can ensure that a user is not served data by the resource that the user should not have access to.

The multi-tenant computing environment 100 and its components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the traditional access control system 115 or the data-based access control system 120, for example. The computing devices can additionally have network communication devices. The network communication devices can enable the computing devices to communicate with each other and with any number of user devices over a network. The network can be a wired or wireless network. For example, the network can be a fiber optic network, Ethernet® network, a satellite network, a cellular network, a Wi-Fi® network, a Bluetooth® network, or the like. In other implementations, the computing devices may be several distributed computing devices that are accessible through the Internet. Such computing devices may be considered cloud computing devices.

Figure 2:
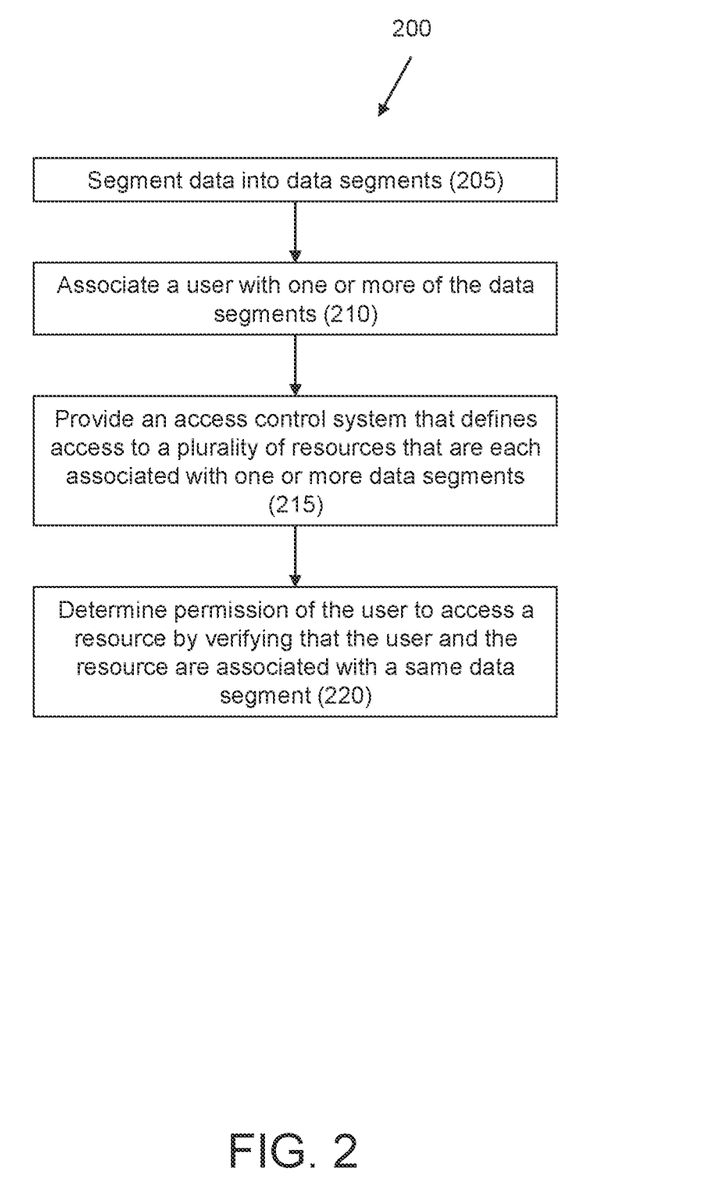
FIG. 2 is a flow chart of example process for controlling access to a computing environment that has a plurality of resources that access data.

FIG. 2 is a flow chart of example process 200 for controlling access to a computing environment that has a plurality of resources that access data. The process 200 can be performed by a system of one or more computers in one or more locations. For example, the process 200 can be performed by the traditional access control system 115 and the data-based access control system 120 of FIG. 1.

The computing environment can be a multi-tenant computing environment. A multi-tenant computing environment can be a computing environment in which a single instance of software serves multiple tenants. A tenant can be a group of users who share common access privileges to the software instance. The software instance can provide each tenant a dedicated share of its data, software services, configurations, and user management functionality.

The computing environment can have a plurality of resources. The plurality of resources can be data, data management tools (e.g., database management systems), software services (e.g., software applications), and the like. In general, the plurality of resources can access, process, and serve data that is stored in the computing environment. In some cases, the resources can serve the data or derivatives of the data to users of the computing environment through graphical user interfaces.

The process 200 may include a plurality of operations. Some of the operations may occur sequentially or in parallel and may be ordered in different configurations. In one operation, the system can segment the data stored in the computing environment into a plurality of data segments (205). The data segments can be virtual partitions of the data. That is, data in one segment may not necessarily be physically isolated, e.g., be on a separate server, from data in another segment. The data segments can be disjoint, overlapping, hierarchical, or some combination thereof. In some cases, at least two of the data segments can have data in common. In some other cases, one data segment can be a subset of another data segment. The data segments can define a hierarchical tree of data in the computing environment.

The segmenting can be based on geographical, political, or physical boundaries. For example, the segmenting can be based on city, county, state, region, country, or continent boundaries or borders. In the case of a pharmaceutical sales platform, for example, the system can segment U.S. healthcare provider data and Canada healthcare provider data into two different data segments. The system can further segment the U.S. healthcare provider data into multiple data segments that are each associated with a region of the U.S., e.g., the West Coast, the Mountain West, the Midwest, the Southeast, the Mid-Atlantic, and New England. The system can further segment the regions into states, counties, or cities. Geographically segmenting data can be advantageous because particular sales representatives may be responsible for selling drugs in a particular region and may need to access data only for that region.

The segmenting can alternatively or additionally be based on legal or corporate boundaries. For example, the system can segment different companies' or subsidiaries' data into different data segments. The companies or subsidiaries can be customers that use the computing environment. Segmenting the data by company can be advantageous because, in general, one company should not be able to access another company's data.

The segmenting can alternatively or additionally be based on roles or positions within a company or customer. For example, in some cases, the system can segment data for regional managers, district managers, and sales representatives into three different data segments. In many cases, the segmenting can be based on a combination of the above factors.

The system can automatically segment the data into the data segments using empirical, artificial intelligence, or machine learning methods. Machine learning algorithms can be trained to predict one or more outputs from one or more inputs. For example, a machine learning algorithm can be trained to predict useful data segments given a data set stored in the computing environment.

The machine learning algorithm can be a supervised machine learning algorithm. A supervised machine learning algorithm can be trained using a set of labeled training examples, i.e., a set of inputs with known outputs. The training process can involve providing the inputs to the machine learning algorithm to generate predicted outputs, comparing the predicted outputs to the known outputs, and updating the algorithm's parameters to account for the difference between the predicted outputs and the known outputs. For example, a machine learning algorithm can be trained to predict useful data segments by providing to it an example data set of the computing environment. Portions of the example data set can be labeled as belonging to one or more data segments. In some cases, the labels can be provided by human administrators.

The machine learning algorithm can alternatively be an unsupervised learning algorithm. For example, the machine learning algorithm can be a clustering algorithm. A clustering algorithm can be configured to group similar data in a data set into data segments.

The machine learning algorithm can be a neural network, such as a feedforward neural network, a convolutional neural networks (CNNs), or recurrent neural networks (RNNs). Neural networks can employ multiple layers of operations to predict one or more outputs, e.g., data segments. Neural networks can include one or more hidden layers situated between an input layer and an output layer. The output of each layer can be used as input to another layer, e.g., the next hidden layer or the output layer. Each layer of a neural network can specify one or more transformation operations to be performed on input to the layer. Such transformation operations may be referred to as neurons. The output of a particular neuron can be a weighted sum of the inputs to the neuron, adjusted with a bias and multiplied by an activation function, e.g., a rectified linear unit (ReLU) or a sigmoid function.

Training a neural network can involve providing inputs to the untrained neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training may be complete when the predicted outputs satisfy a convergence condition, e.g., a small magnitude of calculated cost as determined by the cost function.

The machine learning algorithm can alternatively be a logistic regression algorithm, a regression tree algorithm, a support vector machine (SVM), a naive Bayes algorithm, a random forest algorithm, or the like. Such machine learning algorithms can be trained using supervised learning, unsupervised learning, semi-supervised learning, or reinforcement learning.

In some cases, an administrator for a company can manually segment the data into data segments based on preexisting knowledge of user positions within the company.

In another operation, the system can associate a user of the computing environment with one more of the data segments (210). The user can be a human user or an automated agent. An automated agent can be artificial intelligence or other software that uses the resources of the computing environment to take one or more actions, e.g., scheduling a meeting or making a sales call.

In some cases, the system can automatically associate the user with the one or more data segments using empirical, artificial intelligence, or machine learning methods. Such an automatic association can be based on metadata associated with the user, e.g., the user's location, title, supervisor, direct reports, salary, and the like. The system may provide such metadata to a machine learning algorithm that is trained to assign the user to the appropriate data segments. The machine learning algorithm may be any one of the machine learning algorithms described above or elsewhere in this disclosure. The machine learning algorithm may be trained on metadata for a plurality of users and label data identifying the appropriate segments for such plurality of users. The learning process may be a supervised learning process.

In some other cases, an administrator can manually associate a user with one or more of the data segments. In some such cases, the administrator can associate the user with (i) data segments that the administrator is associated with or (ii) data segments that are a subset of data segments that the administrator is associated with, but not other data segments. This can prevent administrators from delegating access that they do not have. The manual association of a user with a data segment may be a trivial process for an administrator because users may be created in the context of a specific access. For example, a company may hire an employee to fill a "District Manager" role, and it may be evident to an administrator that the employee's user profile should be associated with the "U.S. District Manager" data segment. Assigning the user to a role may not be as simple because the role may define access to a complex combination of data and software instances.

In still other cases, the system can automatically associate a user with one or more of the data segments, and an administrator can verify that such associations are correct.

The system can associate the user with the data segments prior to the user attempting to access any portion of the data in the computing environment. That is, the system can associate the user with data segments when the user is created. In general, the users can be assigned to the smallest data segment or smallest collection of data segments that are necessary for the user to do his or her job.

In another operation, the system can provide an access control system that defines access to the plurality of resources (215). The access control system can be a role-based access control (RBAC) system. An RBAC system can define a plurality of roles. Each role can define resources or operations that users assigned to the role can access or perform. In an RBAC system, users are assigned to roles and through the roles inherit permissions; users are not assigned permissions directly. This can simplify common operations, such as adding a user, or changing a user's department. However, an administrator who assigns a role to a user may need to verify that the user can have all of the permissions associated with the role. This additional complexity can result in human error. In the computing environment described herein, each role can define access to one or more resources or data segments. When assigning a role to a user, the system or administrator may specify the application instance to which the role applies.

The access control system can alternatively be an attribute-based control system (ABAC). An ABAC system is an access control system that can define access to resources through the use of policies that evaluate whether a combination of attributes is true or false. The policies can use many types of attributes, e.g., user attributes, resource attributes, object attributes, environment attributes, and the like. An ABAC system can perform Boolean logic on the attributes to evaluate access requests. Unlike RBAC systems, which can have pre-defined roles, an ABAC generally evaluates access requests when such access requests are made.

The access control system can alternatively be an access control list. an ACL can specify which users or processes (e.g., software services) have access to which objects (e.g., data). Each entry in an ACL can specify a subject and an operation. For instance, if a file object has an ACL that contains (Alice: read, write; Bob: read), this would give Alice permission to read and write the file and Bob to only read it.

In some cases, the computing environment can use a combination of these access control systems.

Like the user, each of the plurality of resources can be associated with one or more data segments. The data segments that a resource is associated with can be data segments that the resource needs to access. For example, the data segments can be data segments that the resource will process, or data that the resource will serve to a user. In general, downstream resources, e.g., resources that use data from the resource, may also need to be associated with the same data segments.

The system can automatically associate resources with data segments. Alternatively or additionally, a human administrator can manually associate resources with data segments. In some cases, the system can initially associate a resource with data segments, and a human administrator can verify that the associations are correct.

In another operation, the system can determine permission of the user to access a resource in the computing environment (220). Determining the user's permission to access the resource can involve determining that the user has access to the resource according to the rules of the access control system provided in operation 215. For example, operation 220 can involve determining that the user is assigned to a role that grants the user permission to access the resource (if the access control system is an RBAC system) or that the user is on an access control list for the resource (if the access control system is an ACL). In this way, the access control system can serve as a first line of defense against unauthorized access.

Operation 220 can additionally involve verifying whether the user and the resource are associated with at least one same data segment. This verification can provide an extra layer of protection against authorized access. In particular, this extra verification can reduce the consequences of a human error, e.g., in assigning a user to a role or putting a user on an access control list. If the user is not associated with at least one same data segment, the system can prevent the user from accessing the resource. In some cases, the system can instead verify that the user is associated with all of the one or more data segments associated with the resource.

The verification operation can be integrated into the access control system. That is, the verification operation can be performed when an administrator attempts, for example, to assign a role to the user or add the user to an ACL. If the system cannot verify that the user and the resource, which may be a resource that is accessible by users who are assigned to the role or to the ACL for the resource, are associated with at least one same data segment or all of the same data segments, the system can fully or partially reject the role assignment or reject the user's addition to the ACL. Alternatively, the system can perform the verification operation independent of the access control system to prevent undesirable access after the access control system has already provided permission to the user to access the resource. For example, the system can perform the verification when the user actually attempts to access the resource or sometime before the user attempts to access the resource but after the user has already been assigned to a role or added to an ACL.

Figure 3:
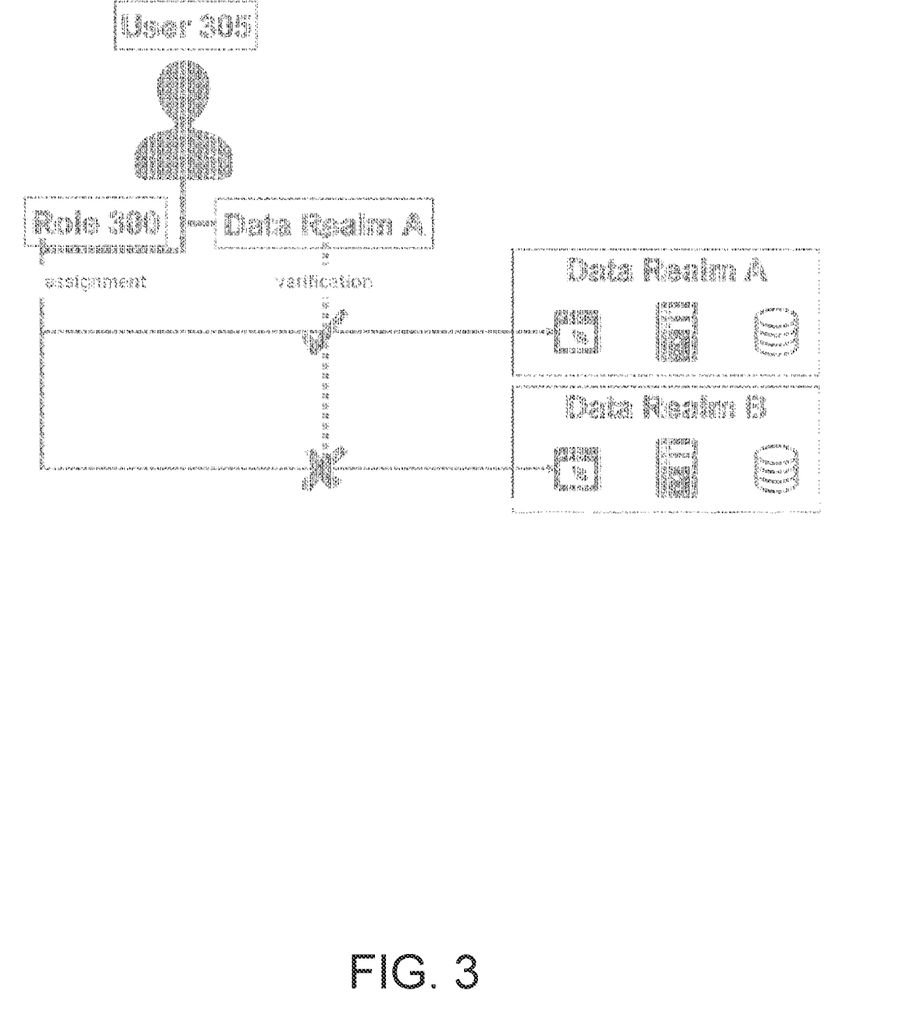
FIG. 3 schematically illustrates the process of FIG. 2 in the context of a role-based access control system.

FIG. 3 schematically illustrates the process 200 in the context of an RBAC system. The RBAC system can have a role 300. The role 300 can provide users assigned to the role access to applications and databases that process or serve data from data segments A and B. As such, the system can associate the role 300 with data segments A and B. The system can also associate a user 305 with data segment A based, for example, on a pre-existing understanding of the user's position within a company. If the system attempts to assign the user 305 to the role 300, the system can verify that both the role 300 and the user 305 are associated with data segment A. However, the system can recognize that the user 305 is not associated with data segment B. In some cases, the fact that the user 305 is associated with data segment A may be sufficient to allow the user 305 to be assigned to the role 300, e.g., if data segment B is a child of data segment A. In other cases, the system may reject the assignment of the user 305 to the role 300 because the user 305 is not associated with all of the data segments that the role 300 is associated with. In still other cases, the system may allow the assignment of the user 305 to the role 300 but prevent the user 300 from accessing resources that use data segment B.

Figure 4:
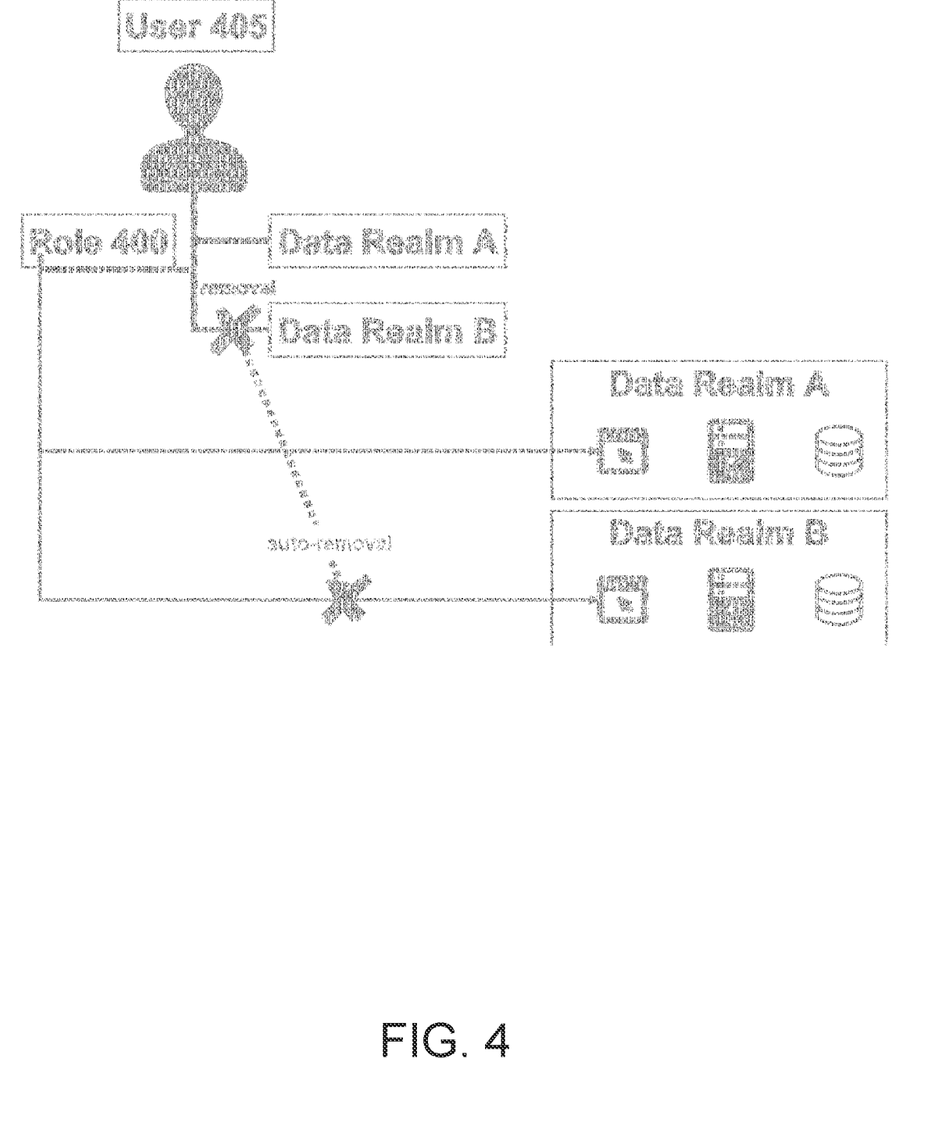
FIG. 4 schematically illustrates a process for automatically removing a user's permissions.

In some cases, the process 200 can further comprise repeating the verifying operation if the user is disassociated from one or more data segments. The system can perform this process automatically as illustrated in FIG. 4. FIG. 4 schematically illustrates a user 405 who initially has a role 400 as defined by an RBAC system and is associated with data segments A and B. The role 400 may be defined by collection of resources, e.g., applications or databases, that process or serve data from data segment A, data segment B, or both. If the user 405 is disassociated from data segment B, the system can automatically remove the user's access to resources that require access to data segment B. This may change the scope of the user's role. As an example, if a user moves to Canada from the U.S., an administrator may dissociate a U.S. data segment from user, which may automatically cause the user to lose access to applications that serve U.S. data.

Similarly, if the access control system is modified, e.g., if a role in the access control system is re-defined such that the resources it grants access to process or serve different data segments, the system can repeat the verifying operation.

The system can generate a graphical representation of the data segments that the user is associated with. An administrator can use such a graphical representation to audit user data assignments.

The system can perform the process 200 for many resources and many users simultaneously.

Although this disclosure primarily refers to multi-tenant computing environments for marketing and selling drugs to health care providers, the access control systems described herein can be used to control access to any type of multi-tenant computing environment, e.g., application development platforms, data processing platforms, point-of-sale systems, enterprise software, manufacturing software, or the like.

Computer Systems

Figure 5:
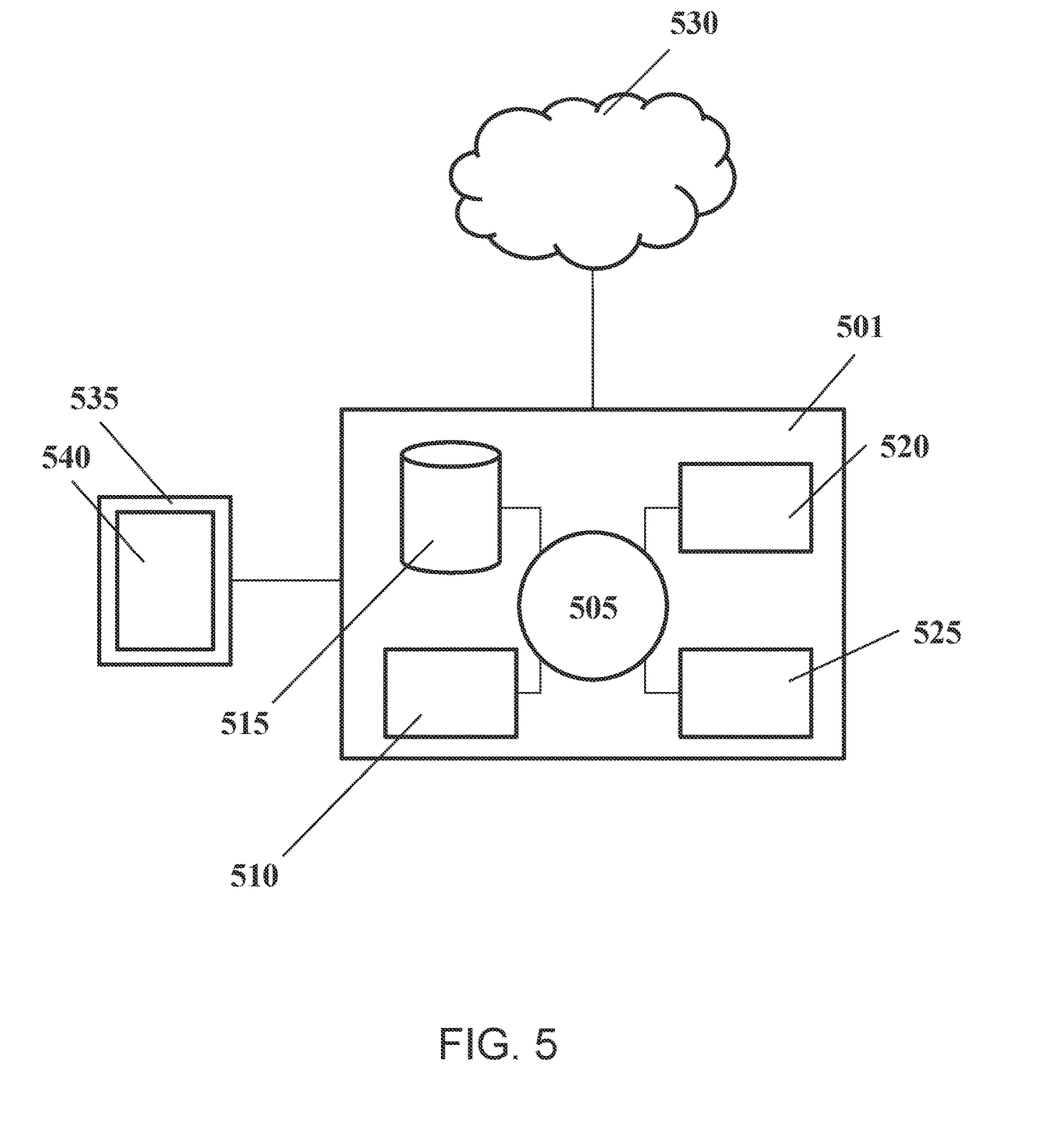
FIG. 5 shows a computer system that is programmed or otherwise configured to implement methods provided herein.

The present disclosure provides computer systems that are programmed to implement methods of the disclosure. FIG. 5 shows a computer system 501 that is programmed or otherwise configured to implement the access control systems described herein.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., a tenant of the multi-tenant computing environments described herein). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine-readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, visualizations about user's data permissions in the multi-tenant computing environments described herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, implement the process 200 of FIG. 2.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A multi-tenant computing environment for providing access to a plurality of resources for a plurality of users, comprising:
   (a) a plurality of data segments, wherein a data segment is associated with at least one respective resource of the plurality of resources and at least one respective user of the plurality of users, and wherein
      the plurality of data segments is produced by segmenting data using machine learning or artificial intelligence based on (i) geographical boundaries or (ii) political boundaries and at least one of legal or corporate boundaries or roles or positions within a company, and
      the plurality of resources comprises (i) drug sales data and (ii) health care provider data, and at least one of a database management tool, a scheduling tool, or a lead generation tool;
   (b) a first access control system comprising at least one computer, wherein the first access control system is a role-based access control system (RBAC), an attribute-based access control system (ABAC), or an access control list (ACL), wherein the first access control system grants or denies an access of at least one user of the plurality of users to at least one resource of the plurality of resources, and wherein the at least one resource is associated with at least one data segment of the plurality of data segments; and (c) a second access control system comprising at least one computer in communication with the first access control system, wherein when the first access control system grants the access of the at least one user to the at least one resource, wherein the second access control system is configured to verify whether the at least one user and the at least one resource are associated with the at least one data segment, and wherein, when the at least one user and the at least one resource are not associated with the at least one data segment, to deny the access of the at least one user to the at least one resource.

2. The multi-tenant computing environment of claim 1, wherein a resource of the plurality of resources is associated with a different position at one of a plurality of customers.

3. The multi-tenant computing environment of claim 1, wherein granting the access provides a user a dedicated share of data, software services, configurations, and user management functionality.

4. The multi-tenant computing environment of claim 1, wherein a data segment of the plurality of data segments is a subset of another data segment.

5. The multi-tenant computing environment of claim 1, wherein the at least one user is a human user or an automated agent.

6. The multi-tenant computing environment of claim 1, wherein the plurality of resources comprises a plurality of software services.

7. The multi-tenant computing environment of claim 1, wherein the granting or denying access to the at least one resource and the associating the data segment with the at least one resource are performed in parallel.

8. The multi-tenant computing environment of claim 1, wherein the machine learning comprises a supervised machine learning algorithm.

9. The multi-tenant computing environment of claim 8, wherein the machine learning comprises using a neural network.

10. The multi-tenant computing environment of claim 8, wherein the machine learning comprises a logistic regression, a support vector machine, a naive Bayes algorithm, or a random forest algorithm.

11. The multi-tenant computing environment of claim 1, wherein the machine learning is performed using metadata.

12. The multi-tenant computing environment of claim 11, wherein the metadata comprises one or more of a location, a title, and a supervisor of the user.

13. The multi-tenant computing environment of claim 1, wherein the machine learning comprises an unsupervised machine learning algorithm.

14. The multi-tenant computing environment of claim 1, wherein a resource of the plurality of resources is automatically associated with the data segment.

15. The multi-tenant computing environment of claim 1, wherein one or more data segments of the plurality of data segments are disjoint, overlapping, or both.

16. The multi-tenant computing environment of claim 1, further comprising a graphical representation of at least one data segment associated with at least one user.

17. The multi-tenant computing environment of claim 1, wherein the first access control system and the second access control system simultaneously grant or deny access to a plurality of users.

* * * * *